United States Patent [19]
Hochstrasser

[11] 3,845,715
[45] Nov. 5, 1974

[54] SYSTEM FOR POSITIONING A VEHICLE
[75] Inventor: Rolf Hochstrasser, Aarau, Switzerland
[73] Assignee: Oehler-, Wyhlen-Lagertechnik A.G., Aarau, Switzerland
[22] Filed: Aug. 24, 1972
[21] Appl. No.: 283,371

[30] Foreign Application Priority Data
July 27, 1972 Switzerland...................... 12732/72

[52] U.S. Cl............................ 104/1 R, 214/16.4 A
[51] Int. Cl. ......................................... H01h 35/00
[58] Field of Search.............. 104/1 R; 246/2 S, 2 F, 246/2 E; 214/16.4 A; 518/592, 593

[56] References Cited
UNITED STATES PATENTS
3,691,398  9/1972  Burch ............................ 214/16.4 A
FOREIGN PATENTS OR APPLICATIONS
800,190  8/1958  Great Britain...................... 246/2 S Primary Examiner—Lloyd L. King
Assistant Examiner—George H. Libman
Attorney, Agent, or Firm—Abraham A. Saffitz

[57] ABSTRACT

For automatically positioning a vehicle at a desired target stop, e.g. a lifting truck in a warehouse, the vehicle has several inductively functioning reading heads, while each possible stop has its own identification constituted by metallic angle sections capable of causing inductance changes in the reading heads. The output from the heads is passed to a comparator fed with a reference value representing the target. Each stop has a further angle section co-operating with a further reading head on the vehicle so as to provide an activating and de-activating signal for the first-mentioned reading heads.

1 Claim, 7 Drawing Figures

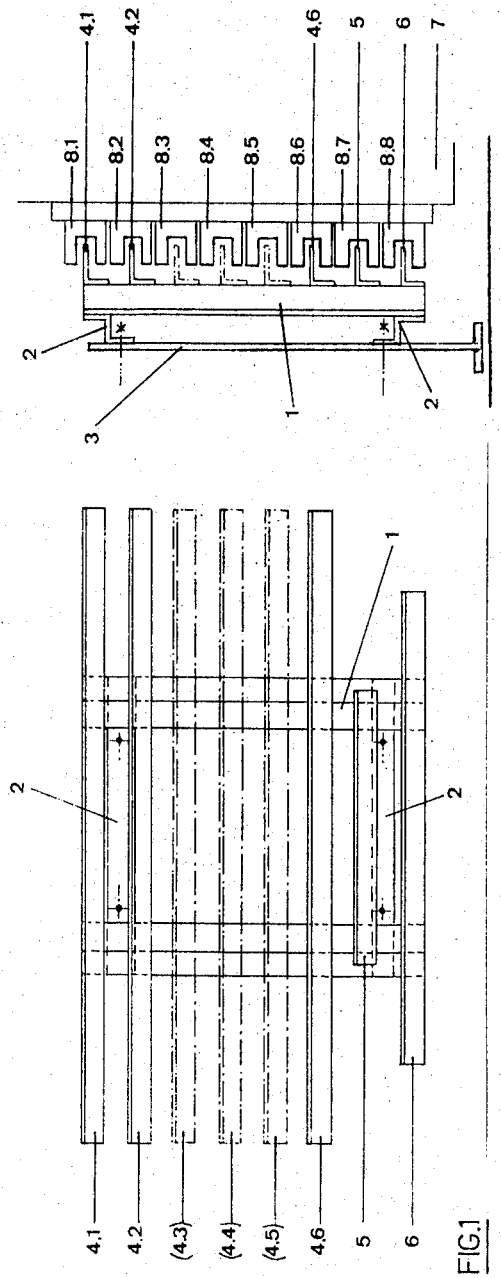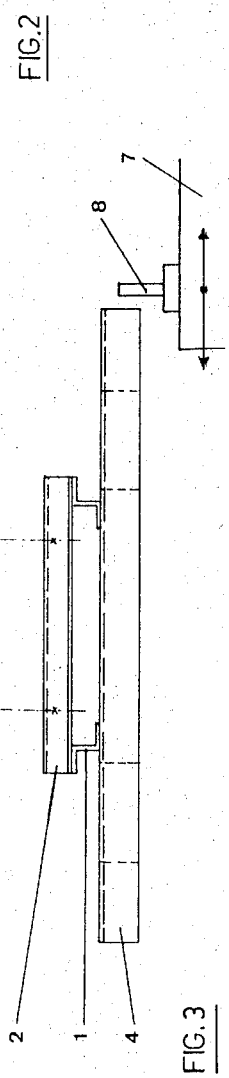

SYSTEM FOR POSITIONING A VEHICLE

The present invention relates to a system for positioning a vehicle which is movable over a track along which a plurality of permanently positioned stops (station) are located.

In operational control of repetitive, more or less complicated functions, e.g. transfer and transposing devices for machine tools, injection die casting machines, transport installations, warehouses etc., the problem frequently arises of automatically controlling the movement cycle of a single movable element of a plant, e.g. a goods conveying vehicle in shelf storage installations, so that a predetermined target or destination is reached with certainty and great accuracy. The chief demand from such automatic positioning systems consists in attaining the target or destination in the least possible time expenditure but with the required accuracy. In addition, the means employed for the realisation of these requirements must be economically acceptable and very reliable in operation. Furthermore, the system employed should be as versatile as possible to enable programme alterations to be effected reliably and without substantial loss of time.

Particularly for large plants having long travel paths to be covered by the vehicle, systems with contactless reading off (inductive sensing) an identification mark located at a stop are desirable and have been used. One known system with contactless reading of a coded identification mark is constructed as follows. On the vehicle which is to be positioned at a target or destination, a row of inductively functioning measuring heads, in the form of so-called slot actuators, are arranged horizontally, side-by-side and in series. These actuators have essentially a U-shaped section and their number is dependent on the code used and on the number of stops.

Position indicators cooperate with the measuring heads, said indicators being formed as relatively thin, prismatic, metallic and non-metallic bodies and being arranged side-by-side in a row at each stop. The position and orientation of these indicators is so selected that as the vehicle travels past them they enter the slots formed in the measuring heads in the vehicle to cause a change of inductance therein. The travel of the vehicle past the arrangement of metallic and non-metallic position indicators in the same row produces a pulse train in the measuring heads which serves as a recognition code for the stop that has just been passed. However, the above described horizontal arrangement requires a very rapid reading of the recognition code and consequently necessitates a store (memory) so that the pulse pattern can be compared with a reference code corresponding to the ultimate target which is aimed at.

Another arrangement of the prior art is known wherein read-off units or measuring heads are located on the vehicle are used as so-called approach or proximity actuators and are grouped together. A number of metallic platelets arranged on a non-conducting plate provided at each station or stop is provided in this system and these platelets cooperate with these read-off units. Precaution must be taken here, so that the individual platelets can be read by more than one measuring head. In this way it is achieved that the code is immediately available as a group code and no longer needs to be stored for later verification. On the other hand, this advantage of eliminating storage is achieved at the cost of being able to read the identification marks at only very slow travel speeds, which necessitates either a very time wasting period of mode of conveying of the goods to be transported or requires the drastic braking of the vehicle in the vicinity of each stop where code recognition is to take place.

The present invention is based on the discovery that it is possible to avoid the drawbacks of the two previously described prior art systems while simultaneously preserving their advantages. This invention has as its objective, to provide a vehicle positioning system and apparatus, therefore permitting the contactless reading (inductive sensing) of identification marks at stops without the need for temporary signal storing and with normal, relatively fast or high traveling speed of the vehicle. This inductive vehicle positioning objective is achieved so that during normal travel speed of the vehicle the identification mark is read integrally during a certain time interval which is dependent on the speed of the vehicle and compared with a desired (reference) value, while the reading of the identification mark and its comparison with the previously provided desired value during the passing of the vehicle are set off and terminated by the same component through the contactless (inductive) reading of an identification mark provided at the stop.

According to one aspect of the present invention there is provided apparatus for automatically positioning a vehicle which is movable over a path along which there are a series of stops each at predetermined locations, the apparatus comprising coded stop identification means associated with each stop for uniquely identifying the associated stop; first sensing means on the vehicle for the contactless (inductive) sensing of said stop identification means and for producing an output in response to said stop identification means; means for comparing said stop identification output with a reference value representing an ultimate target at which it is desired to position the vehicle, control means for causing said vehicle to move and to halt when said output and said reference value are in a predetermined relationship; and actuating means for initiating and terminating the operation of said first sensing means, said actuating means including a control mark adjacent said stop identification means and a second sensing means on the vehicle for the contactless sensing of, and for producing an actuation/termination signal in response to, said control mark.

In a preferred embodiment, the stop identification means is in the form of a plurality of mutually parallel metallic angle sections borne on a frame in a readily releasable and detachable manner; while the first and second sensing means are constituted by inductively functioning reading heads, there being a slot in each said head for receiving said angle sections.

Preferably, the identification means fixed in the area of the stops comprise a number of mutually parallel metallic angle sections detachably and displaceably arranged on a frame. In addition to the angle sections for identifying a stop, the number of which sections depends on the code used and the number of stops to be identified, the identification means may have at least one further, shorter angle section positioned adjacent thereto for determining the beginning and end of the sensing or reading-off period, which further section is adapted to cooperate with an additional sensing device secured to the vehicle. Further, yet another angle section may be provided for the accurate determination of the halt position of the vehicle at the stop, which section cooperates with two additional sensing or reading devices fixed on the vehicle and arranged at a spacing at least approximately corresponding to the length of the section. The exact desired position of the vehicle relative to the stop is reached when both reading devices deliver a signal, i.e. when both ends of the corresponding angle section are still just inside the reading device. Since even a minimal displacement of the vehicle causes a change in the reading device in this way just explained a very close accuracy, lying in the region of ± 1 mm, can be achieved in positioning of the vehicle.

According to another aspect of the invention, there is provided a system for automatically positioning a vehicle which is movable over a path along which there are a number of stops at predetermined positions, the system providing: each stop along the path with its own individual coded identification means, providing the vehicle with first sensing means for the contactless sensing of the stop identification means and feeding a comparator with a reference value representing a target stop for the vehicle. Between stops the system causes the vehicle to move over said path and produces an output in response to the sensing of the stop indentification means by its first sensing means, passes said output to said comparator to compare the output with the reference value and halts the vehicle when the comparing step gives a predetermined result. The system further controls the beginning and the end of the said sensing step by providing a separate control mark at each stop, senses the control mark by a second sensing means on the vehicle, and produces an actuation/termination signal for the first sensing means in response to the sensing of the control mark.

During loading and unloading, a further problem arises in meeting the objective of the invention, namely that either the vehicle or the shelving may be displaced under the influence of the load change to such an extent that this variation exceeds the positioning accuracy to thereby result in error. The electronic control would in this case immediately introduce a requirement for correction of the position of the vehicle, but this is extremely undesirable because it disturbs the loading and unloading operation, if not rendering it impossible.

It is a further objective of the present invention to solve this last named problem and to provide apparatus of the kind mentioned above for positioning a vehicle, which apparatus includes sensing means (reading devices) secured to the vehicle for cooperation with identification means which are arranged in the region of the stops and which are constructed in the form of mutually parallel metallic angle sections detachably and displaceably mounted on a frame. The new solution to said problem according to this expedient embodiment of the invention consists in that the vehicle has at least three reading devices arranged in a row within reach of angle sections arranged on a frame at the stop and provided for the determination of the exact stop position of the vehicle, and in that the spacing between the two outermost reading devices corresponds at least approximately to the length of the profile, while the further reading device is fixed between the two outermost reading devices.

The operation of the apparatus according to the preferred embodiment is characterised in that during movement of the vehicle the two outermost reading devices are switched on and the vehicle is displaced until the angle section is completely contained between both outermost reading devices, while after the standstill step of the vehicle the further reading devices are switched on, so that no correction movement of the vehicle is necessary nor takes place so long as the angle section is completely contained in between at least two of the three reading devices.

The invention is, now described, by way of example, with reference to the accompanying purely diagrammatic drawings, wherein:

FIG. 1 is a front elevation of a stop (station) identification arrangement, for use with the present invention;

FIG. 2 is a side elevation of the arrangement of FIG. 1, showing also, in section, a vehicle as it travels past the said arrangement;

FIG. 3 is a top plan view of the parts shown in FIG. 2;

Figure 5:
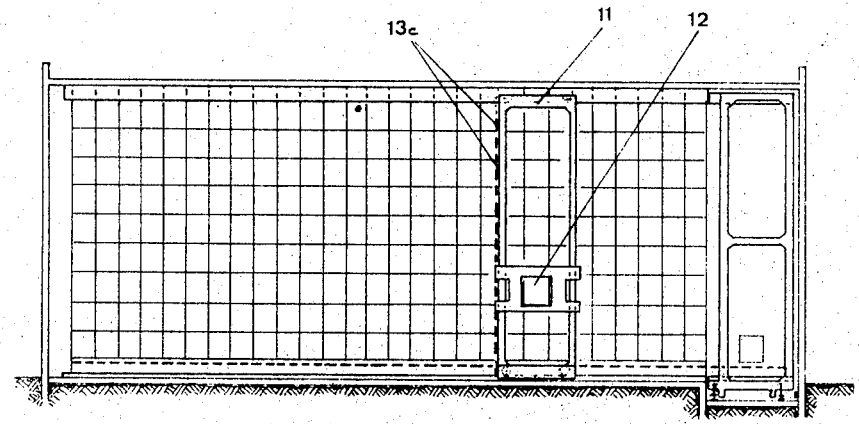
FIG. 5 is a side elevation of the warehouse of FIG. 4, but showing the apparatus of this invention in a different position.

The identification mark arrangement according to FIGS. 1 to 3 consists of a frame constructed from commercially available, standardised metallic sections 1 and 2. The frame is secured in position in the vicinity of a stop by any suitable securing device, e.g. the device 3, (FIG. 2). On the front side (as viewed) of the frame a number of equally long metallic angle sections generally referred to as 4 and individually designated as 4.1, 4.2 and 4.6 are clamped in position so as to extend horizontaly, in parallel, and spaced from each other. The manner of securing the sections 4 is such that they are readily detachable and displaceable. In the embodiment according to FIGS. 1 to 3 the frame is dimensioned for a total of six angle sections 4 of which, however, only three are mounted. The position of the other three is shown with dashed lines. Underneath this group of a maximum of six sections 4 are two further, generally similar metallic angle sections 5 and 6 arranged in parallel with the sections 4. The lowermost section 6 has a somewhat smaller length than the sections 4, while the section 5 is shorter than the section 6. The sections 4, 5 and 6 are generally L-shaped and are fixed in position so that one limb of the L extends perpendicularly from the front face (as seen in FIG. 1) of the sections, i.e. horizontally.

On a schematically illustrated vehicle 7 a number of contactlessly operating reading (sensing) devices, generally referred to as 8 but individually designated as 8.1 to 8.8, are provided in a column, one over the other. The devices 8 are generally U-shaped or channel-shaped and operate inductively. The mutual spacing of the reading devices 8 corresponds to the spacing of the sections 4, 5 and 6 so that the reading devices 8.1 to 8.6 are capable of cooperating with the sections 4.1 to 4.6, the reading device 8.7 with the section 5 and the reading device 8.8 with the section 6, see FIG. 2. This cooperation ensues in the manner that the vertical flanks of the sections standing proud of the frame can enter into slots of the channel-shaped reading devices 8 and thus cause a change in inductance of the measuring heads.

The upper six sections 4.1 to 4.6 serve as the six indicating signs from which the code for the position of a individual stop is made up. If more than six code signs are needed, then naturally a correspondingly higher frame is used on which then appropriately more sections 4 can be arranged. In the illustrated example, the positions 3 to 5 (i.e. the positions corresponding to reading devices 8.3 to 8.5) are empty, but for positions 1, 2 and 6 angle sections 4 are present. The position code will thus be read as "110001" by the reading devices (heads) arranged in correspondence with the possible positions, where L indicates a presence of angle section.

The lowermost angle section 6, which cooperates with the reading head 8.8, serves for initiating the reading of the code. Only when this lowermost section 6 enters the associated head 8.8 is a signal given with which the other heads 8.1 to 8.6 are switched on. In this way it is achieved that the sections 4.1 to 4.6 enter into the corresponding reading heads 8.1 to 8.6 with certainty. Thus, no role can be played by inaccuracies in the dimensions of the sections 4 or by the imprecise mounting of individual sections and they cannot disadvantageously influence the reliable positioning of the vehicle. Correspondingly, the reading heads 8.1 to 8.6 are switched off as soon as the reading head 8.8 has reached the end of the section 6. Until that point in time the sections 4.1 to 4.6 are positively entered in the reading heads 8.1 to 8.6, so that a possible disturbance of the reading through differences in the length of the sections 4 is reliably avoided.

Figure 4:
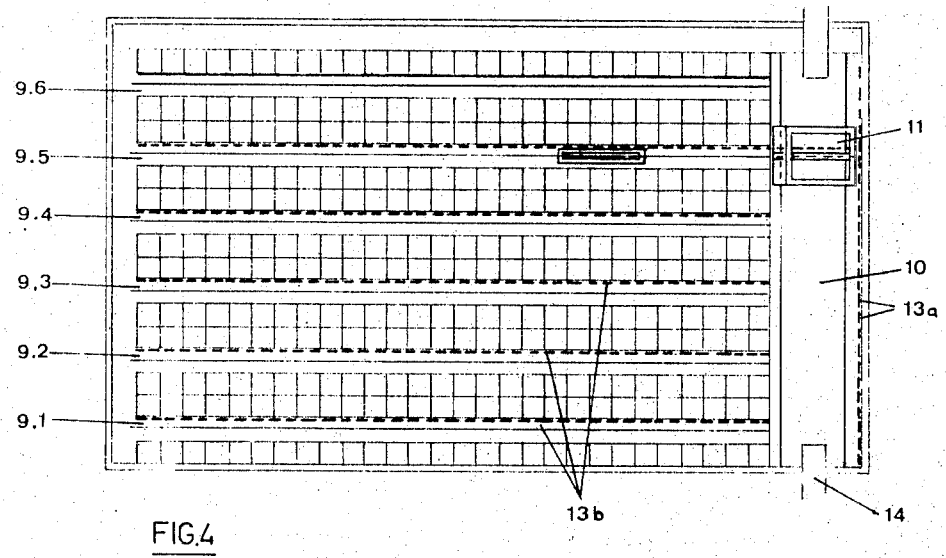
FIG. 4 is a ground plan of a warehouse with shelving wherein the system of the invention is used.

In FIG. 4 the ground plan of a warehouse with high shelving is illustrated, in which the above described positioning system may with advantage be employed. The warehouse is equipped with six gangways generally referred to as 9 and individually designated as 9.1 to 9.6 in which shelf rows are arranged on both sides of a given gangway. As shown in FIG. 5, eight stories are arranged one above the other in each shelf. Along one of the short sides of the warehouse a transverse gangway 10 is provided perpendicular to the gangway 9, in which a conveying vehicle, e.g. a lifting frame 11, is drivably arranged. The lifting frame 11 can be driven in the individual gangways 9 and is provided with a lifting platform 12 which can be vertically displaced to reach the individual stories.

For each longitudinal gangway 9, a respective identification mark 13a is fixed along the transverse gangway 10, while identification marks 13b are arranged for each shelf column. Finally, and analogously, a respective identification mark 13c is arranged vertically on the lifting frame for each story of the shelving.

Suppose now that the platform 12 is loaded at a ramp 14 with the goods to be stored. An information signal is fed into a computer (not shown) which is used for controlling the positioning process and which contains in coded form information relating to the target position of the goods to be stored. The computer is in circuit with the reading devices secured on the vehicle 11, 12 for registering the identification marks, 13a, 13b, 13c and has a comparator so as to continuously compare the signals delivered by the reading devices with the desired (reference) value corresponding to the predetermined target. The conveying vehicle is then actuated and begins to move away from the ramp 14 along the gangway 10, during which the identification marks 13a arranged at the edge of the gangway 10 are continuously read. When, for example, the code of the identification mark 13a for the gangway 9.5 agrees with the given desired value, the vehicle is stopped and begins to move along the gangway 9.5. Similarly, during the travel of the vehicle along the gangway 9.5 the identification marks 13b are continuously read and the vehicle is stopped as soon as an agreement is found again with the desired value. Finally, the whole coincidence-seeking or comparing operation is repeated with respect to the identification marks 13c until the platform 12 finds itself at the target, where the goods can then be unloaded. Means (not shown) are also provided for automatically recalling the vehicle to a predetermined location, e.g. ramp 14.

Figure 7:
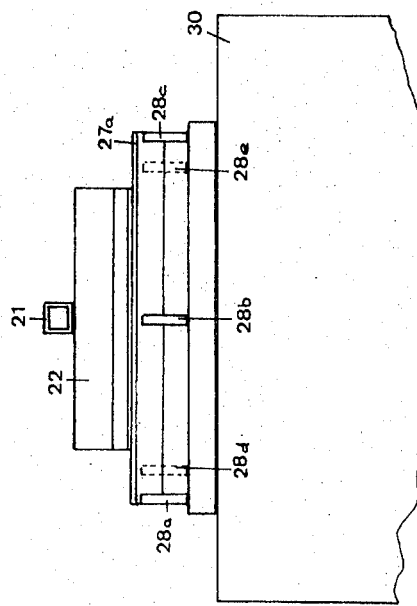
FIG. 7 is a top plan view of the apparatus of FIG. 6.
Figure 6:
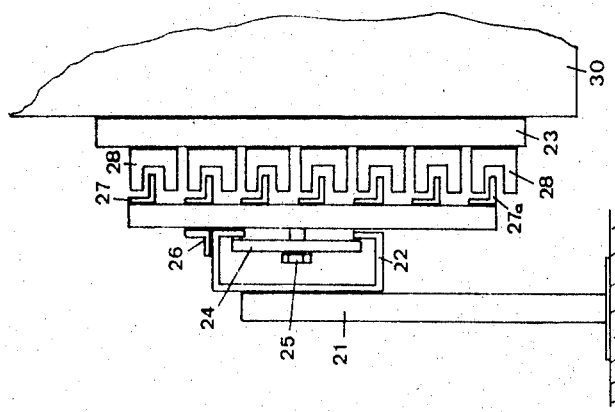
FIG. 6 is a transverse section of a modified stop (station) identification mark arrangement, shown at the moment when a vehicle travels past it.

In FIGS. 6 and 7 a further embodiment of an identification mark arrangement is shown. This embodiment is generally similar in most respects to the previously described embodiment, and accordingly only the differences will be described in detail.

A C-section 22 is arranged fast on an upright support 21 anchored to the ground and has a frame readily detachably and displaceably secured thereto. The connection of the frame with the section 22 is by way of an abutment plate 24 which is coupled with the frame by a screw 25 extending from the frame such that the plate 24 bears against both of the free longitudinal edges of the section 22. Tightening of the screw 25 pulls the frame against the section 22. By loosening the screw 25, the frame can be displaced longitudinally and thus its precise position can be adjusted. The securing of the position of the frame in the vertical direction is effected by a catch 26 secured to the frame.

The frame is provided with a number of parallel, horizontally adjacently arranged angle sections 27 which are generally similar to the sections 4 and which are capable of entering into associated reading devices 28 mounted on a frame member 23 of the vehicle 30. In the present example it is assumed that the lowermost section, designated 27a, serves for determining the exact position of the vehicle relative to a given stop. To this end, three, horizontal, adjacently and spacedly arranged reading devices 28a, 28b and 28c, similar to the reading devices 8 described above, are secured to the vehicle 30. The spacing of the reading devices 28a and 28c corresponds to the length of the section 27a, while the reading device 28b is mounted anywhere intermediately between the two reading devices 28a and 28c.

During movement of the vehicle all the reading devices 28 for reading the position of the vehicle, as well as the reading devices 28a and 28b, are switched on. After the reading device 28 has signalled the identification of a stop at the control appliance (computer) and the comparator has found an agreement with the previously given reference value, the vehicle is braked and moves further at a slow speed until the section 27a has entered into both reading devices 28a and 28c. Now the vehicle is in the exact desired position at the correct stop and the loading or unloading may commence. However, in order to obviate the need for a correction of the position of the vehicle due to a change during the loading operation, the third reading device 28*b* is now actuated. The control is so arranged that no movement of the vehicle occurs so long as the section 27*a* is within at least two of the heads. In this way a position correction of the vehicle during loading is reliably avoided, which correction in certain circumstances could lead to damaging or destroying the loading device.

In a further embodiment of the apparatus, two further reading heads 28*d* and 28*e* are provided, respectively, directly next to the heads 28and 28*c*. These are shown in dashed lines in FIG. 7. After the vehicle has come to a standstill, in this embodiment, the two outer reading devices 28*a* and 28*c* are switched off and the two reading devices 28*d* and 28*e* are switched on. In this condition the vehicle can perform small lateral movements in both directions without the section 27*a* disengaging from either one of the two heads 28*d* or 28*e*.

In the above preferred embodiments, it is possible to move the lifting frame or platform at full speed without any possibility of disturbances arising in the reading of the identification marks. A further advantage, especially in connection with high shelf stores, resides in that an extremely fast and trouble-free correction of the exact position of the identification marks can be effected, which is particularly important because, as is well-known, such stores settle somewhat in the course of time or can become displaced in another way, e.g. through thermal influences.

Moreover, due to the arrangement of the section 6, the apparatus is completely insensitive to small changes in the length of, or inaccuracies in the mounting of, the sections 4.1 to 4.6.

It must be remarked further that the identification mark can be read for a relatively long time during travel therepast and thus is readable at substantially all practical vehicle travel speeds. The effective reading time can in given cases be measured with great accuracy and the apparatus is therefore applicable to determination and control of travel speed. The reading-off takes place simultaneously for all code signs with direct conversion in the circuit as digital control elements. A temporary storage of the actual value is unnecessary, whereby a not insignificant source of disturbance is eliminated. In the case of a power cut, the vehicle remains stationary and the actual value of the position is fully "held"; on restoration of power the actual position value is again immediately available.

I claim:

1. In a system for automatically positioning a vehicle along a path interrupted by stops in its movement at predetermined locations along said path and for sensing the location of said vehicle coming to a stop at each location by means of inductively functioning reading heads located on said vehicle, coded stop identification means at a side of said path which produce an output in response to the positioning of said reading head adjacent said coded stop identification means, control means to cause the vehicle to move to a coded stop identification means and to stop at said identification means in response to a comparison signal between the output signal read at said stop and a reference signal which determines the ultimate distination at the end of said path that improvement in construction and organization of the stop identification means at a predetermined location and of the inductively functioning reading heads on said vehicle comprising:

a frame member at each predetermined stop position located along said vehicle path adjacent the movement and stopping position of the vehicle under the control of the output signal of the inductively functioning reading heads on the vehicle;

coded stop identification means mounted on said frame member formed of a coded plurality of mutually parallel metallic angle sections detachably supported on said frame member;

a first reading head on said vehicle consisting of an inductance means which, in proximity to said stop identification means produces an output which identifies the specific predetermined stopping position corresponding to said coded stop identification means;

a second reading head spaced from said first reading head by a distance equal to the length of said coded plurality of angle sections which is mounted on said vehicle on the same side as said first reading head to provide a band having ends between which the adjacent stop identification means can be positioned, thereby providing a termination position of said vehicle corresponding to the inductive output signal having a maximum at this precise stop position;

said first and second reading heads having slots to receive said angle sections;

third and fourth reading heads on said vehicle located between said first and second reading heads spaced apart a distance less than the spacing of the first and second heads whereby proximity to said stop identification means produces an output of said third and fourth heads which allows limited movement.

* * * * *